(12) United States Patent
Albertus et al.

(10) Patent No.: US 11,594,749 B2
(45) Date of Patent: Feb. 28, 2023

(54) HYDROGEN/BROMINE FLOW BATTERY IN WHICH HYDROGEN IS FREELY EXCHANGED BETWEEN TWO CELL COMPARTMENTS

(71) Applicants: Robert Bosch GmbH, Stuttgart (DE); The Regents of the University of California, Oakland, CA (US)

(72) Inventors: Paul Albertus, Washington, DC (US); Edward Knudsen, Menlo Park, CA (US); Michael C. Tucker, Piedmont, CA (US); Kyu Taek Cho, Albany, CA (US); Adam Z. Weber, Pleasant Hill, CA (US)

(73) Assignees: Robert Bosch GmbH, Stuttgart (DE); The Regents of the Univeristy of California, Oakland, CA (US)

( * ) Notice: Subject to any disclaimer, the term of this patent is extended or adjusted under 35 U.S.C. 154(b) by 1518 days.

(21) Appl. No.: 15/104,161

(22) PCT Filed: Dec. 18, 2014

(86) PCT No.: PCT/US2014/071214
§ 371 (c)(1),
(2) Date: Jun. 13, 2016

(87) PCT Pub. No.: WO2015/095555
PCT Pub. Date: Jun. 25, 2015

(65) Prior Publication Data
US 2016/0308237 A1    Oct. 20, 2016

Related U.S. Application Data

(60) Provisional application No. 61/918,014, filed on Dec. 19, 2013, provisional application No. 61/918,859, filed on Dec. 20, 2013.

(51) Int. Cl.
*H01M 4/36* (2006.01)
*H01M 6/24* (2006.01)
(Continued)

(52) U.S. Cl.
CPC ....... *H01M 8/188* (2013.01); *H01M 8/04201* (2013.01); *H01M 8/04208* (2013.01);
(Continued)

(58) Field of Classification Search
None
See application file for complete search history.

(56) References Cited

U.S. PATENT DOCUMENTS 3,894,887 A    7/1975  England
6,261,714 B1   7/2001  Eidler et al.
(Continued)

FOREIGN PATENT DOCUMENTS

WO    2013-086100 A1    6/2013
WO    2015100216 A1    7/2015

OTHER PUBLICATIONS

Machine translation of Hamel et al. (WO2013/086100) "Hydrogen bromide flow battery system for distributed scale applications using pressure balanced cells", pp. 1-40. (Year: 2013).*
(Continued)

*Primary Examiner* — Anca Eoff
*Assistant Examiner* — Julian Anthony
(74) *Attorney, Agent, or Firm* — Maginot, Moore & Beck LLP (57) ABSTRACT

A flow battery system includes a first tank including a hydrogen reactant, a second tank including a bromine electrolyte, and at least one cell including a first electrolyte side operably connected to the first tank and a second electrolyte side operably connected to the second tank. The battery system further includes a direct connection line directly
(Continued)

connecting the first tank and the second tank and configured such that the hydrogen reactant passes between the first tank and the second tank.

15 Claims, 7 Drawing Sheets

(51) Int. Cl.
  *H01M 4/58* (2010.01)
  *H01M 6/04* (2006.01)
  *H01M 6/20* (2006.01)
  *H01M 8/18* (2006.01)
  *H01M 8/04082* (2016.01)
  *H01M 8/20* (2006.01)
  *H01M 8/22* (2006.01)

(52) U.S. Cl.
  CPC ............. *H01M 8/184* (2013.01); *H01M 8/20* (2013.01); *H01M 8/22* (2013.01); *H01M 2250/10* (2013.01); *Y02B 90/10* (2013.01); *Y02E 60/50* (2013.01)

(56) References Cited

U.S. PATENT DOCUMENTS

| | | | |
|---|---|---|---|
| 7,517,608 | B2 | 4/2009 | Brereton et al. |
| 2008/0220318 | A1* | 9/2008 | Brereton ............... H01M 8/188 429/71 |
| 2010/0003545 | A1* | 1/2010 | Horne ................. B60L 11/1824 429/471 |
| 2012/0299384 | A1 | 11/2012 | Peled et al. |
| 2013/0177789 | A1 | 7/2013 | Kampanatsanyakorn et al. |
| 2014/0272483 | A1* | 9/2014 | Pham ................ H01M 8/04276 429/51 |

OTHER PUBLICATIONS

International Search Report corresponding to PCT Application No. PCT/US2014/071214, dated Mar. 31, 2015 (4 pages).
Supplementary Partial European Search Report corresponding to European Patent Application No. 14 87 0855 (13 pages), dated May 2017.
Supplementary European Search Report corresponding to European Patent Application No. 14 87 0855 (13 pages), dated May 2017.

* cited by examiner

HYDROGEN/BROMINE FLOW BATTERY IN WHICH HYDROGEN IS FREELY EXCHANGED BETWEEN TWO CELL COMPARTMENTS

CLAIM OF PRIORITY

This application is a 35 U.S.C. § 371 National Stage Application of PCT/US2014/071214, filed on Dec. 18, 2014, which claims the benefit of priority to U.S. provisional application No. 61/918,014, entitled "Hydrogen/Bromine Flow Battery in which Hydrogen is Freely Exchanged Between Two Cell Compartments," which was filed on Dec. 19, 2013, the disclosures of which are incorporated herein by reference in their entirety.

This application also claims the benefit of priority to U.S. provisional application No. 61/918,859, entitled "Hydrogen/Bromine Flow Battery in which Hydrogen is Freely Exchanged Between Two Cell Compartments," which was filed on Dec. 20, 2013, the disclosure of which is incorporated herein by reference in its entirety.

STATEMENT REGARDING FEDERALLY SPONSORED RESEARCH OR DEVELOPMENT

This invention was made with government support under DE-AR0000137 awarded by the Department of Energy Advanced Research Projects Agency-Energy. The government has certain rights in the invention.

TECHNICAL FIELD

This disclosure relates generally to the field of rechargeable batteries and more particularly to flow batteries and flow battery systems.

BACKGROUND

As intermittent renewable energy sources such as wind and solar increase their share of overall energy production, a method is required to compensate for their intermittency and to match the demand of a power grid in real time. Numerous methods have been discussed to stabilize intermittent renewables, including grid extension to average over larger sets of intermittent assets, demand-side management, ramping of conventional assets, and energy storage, including technologies such as electrochemical storage, such as Li-ion, Na/S, and Na/NiCl$_2$, thermal storage, power to gas, and other energy storage technologies. Flow batteries are one particularly promising technology used to store electrical energy and stabilize power flow from intermittent renewable energy sources. While the most prominent flow battery couple uses vanadium at different oxidation states at each electrode, there are many other couples under consideration, with reactants in the gas, liquid, and solid forms.

One particular flow battery reacts H$_2$ and Br$_2$ to form HBr on discharge. One advantage of this couple is that the H$_2$ reaction is kinetically rapid when catalyzed and the Br$_2$ reaction is kinetically rapid, whether or not the reaction is catalyzed. Rapid kinetics and the ability to obtain components from the related system reacting H$_2$ and O$_2$ in a proton-exchange membrane fuel cell enable the H$_2$/Br$_2$ chemistry to achieve a very high power density. This high power density reduces the area required for a given amount of power and, since the system cost has a significant dependence on the total area over which the reactions are carried out, holds promise for energy storage with reduced costs.

Figure 1:
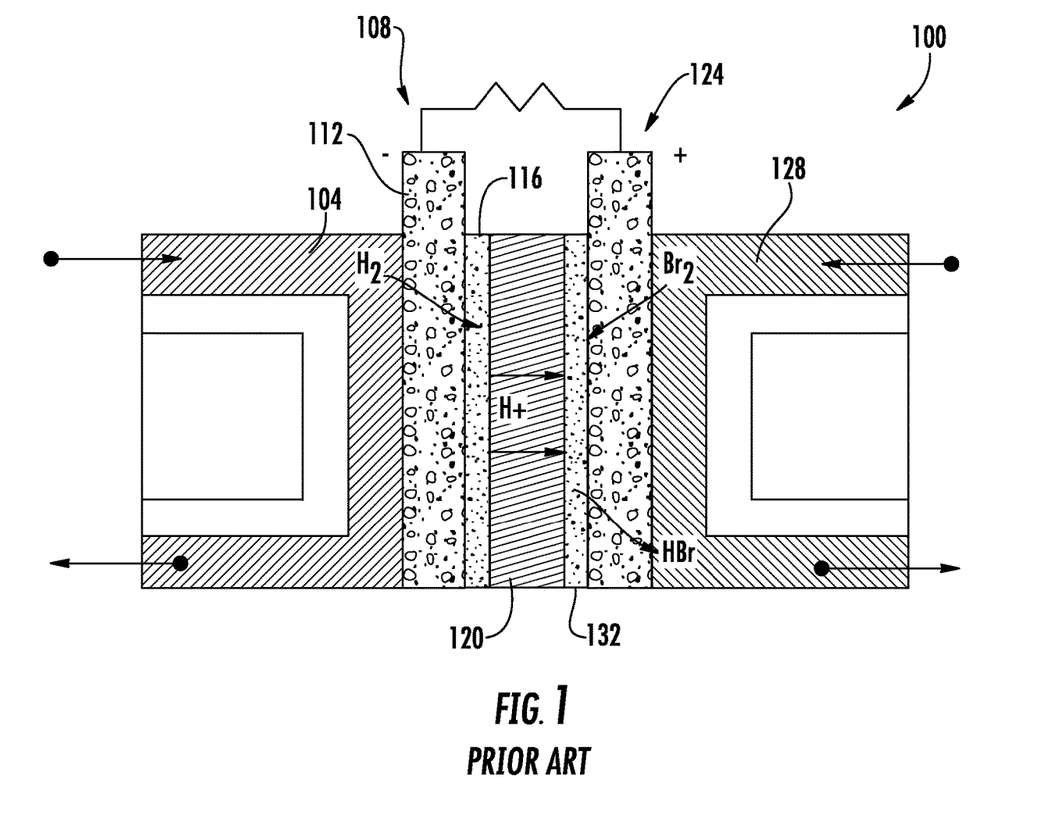
FIG. 1 is a schematic diagram of a conventional flow battery cell.

FIG. 1 illustrates a schematic diagram of a conventional H$_2$/Br$_2$ flow battery cell 100 including a number of cell layers included in the cell 100. FIG. 1 illustrates the reactions occurring during battery discharge, though reversing the illustrated reactions results in charging the battery cell 100. Hydrogen gas (H$_2$) is sent through a hydrogen gas channel 104 into a negative electrode 108, at which a porous medium 112 and a catalyst layer 116 are present. The catalyst layer 116 is typically made of Platinum (Pt) to catalyze H$_2$ oxidation on discharge and hydrogen ion (H$^+$) reduction on charge. During discharge, H$^+$ is produced from the H$_2$ gas via the reaction H$_2 \rightarrow 2$H$^+ + 2$e$^-$. The H$^+$ passes through a membrane 120 to a positive electrode 124, where it is combined with Br– to form hydrobromic acid (HBr) via the reaction Br$_2 + 2$H$^+ + 2$e$^- \rightarrow 2$HBr. The membrane 120, in one or more embodiments, is an ion-exchange membrane, such as the cation-exchange membrane Nafion, or a separator with pores through which the H+ passes. On the positive electrode side, a liquid solution composed of Br$_2$ and HBr is delivered and flows through a Br$_2$/HBr channel 128 by the positive electrode 124. A porous electrode 124 is always present, though the catalyst 132 layer is optional on the positive electrode side since the kinetics of the Br$_2$ reaction (Br$_2 + 2$e$^- \rightarrow 2$Br$^-$ on discharge and 2Br$^- \rightarrow$ Br$_2 + 2$e$^-$ on charge) are fast even on uncatalyzed carbon. The presence of HBr, which typically dissociates to form H+ and Br–, allows for the conduction of ionic current within the porous electrode. The electrons are passed through an external circuit, where useful work may be extracted (discharge) or added (charge) to the circuit.

In many battery systems, reactants exist in a solid form, and only the shuttle ion is mobile. However, in flow batteries, at least one of the reactant materials exists in a liquid or a gas phase. Many of these liquid or gas reactant materials have a tendency to cross through the cell membrane. When these crossover events occur, they can negatively affect the performance of a flow battery. For example, the mobile reactant that has crossed over can directly chemically react with other reactants, which causes a loss of energy since the reaction does not take place electrochemically, and therefore does not generate any useful work. Additionally, crossover events can reduce the charge and discharge capacity of a battery since the reactant material that has crossed over is no longer capable of participating in electrochemical charge and discharge cycles.

Ion crossover results in various problems for different flow battery couples. For example, in a Zn/Br$_2$ battery couple, Br$_2$ in the liquid form can cross over to the zinc metal side, reacting directly on the zinc side instead of at the positive electrode where useful work is produced. In a vanadium/vanadium flow battery couple, vanadium at different oxidation states can cross through the separator and react chemically, reducing the energy efficiency, for example V$^{5+}$+V$^{3+} \leftrightarrow 2$V$^{4+}$. In an iron/chromium battery couple, crossover through the separator causes reactions that reduce the energy efficiency and may result in the need to separate the crossed over ions.

In an H$_2$/Br$_2$ flow battery system, several materials have a tendency to migrate through the cell membrane. For example, H$_2$O, Br$_2$, and HBr (as well as polybromide species such as HBr$_3$) molecules may migrate from the liquid side of the cell to the gaseous side of the cell, while H$_2$ molecules may migrate from the gaseous side of the cell to the liquid side of the cell. The rates of these different crossover processes are a function of material properties, material concentrations, cell conditions, and whether the cell is being charged or discharged.

Completely preventing crossover of the hydrogen species to the bromine side of the battery is difficult to accomplish. In instances where the $H_2$ gas crosses over to the $Br_2$ side of the battery, reactions of the $H_2$ and $Br_2$ in the Br2 side of the battery can reduce the efficiency of the battery since the electrons released are not captured to perform actual work.

Additionally, the pressure differences typically present between the hydrogen gas side and the bromine side of the battery require substantial sealing and mechanical reinforcement within the battery.

Consequently, what is needed is a flow battery system that overcomes the problem of reactant mixing in the case of hydrogen/bromine chemistries, as well as a system that reduces chemical reactions of active materials that have crossed over to improve energy efficiency of the flow battery. What is additionally needed is a flow battery system having reduced pressure differences between the $H_2$ side and the $Br_2$ side of the battery.

SUMMARY

In one embodiment according to the disclosure, a flow battery system comprises a first tank including a hydrogen reactant, a second tank including a bromine electrolyte, at least one cell including an hydrogen reactant side operably connected to the first tank and a bromine electrolyte side operably connected to the second tank, and a direct connection line directly connecting the first tank and the second tank and configured such that the hydrogen reactant passes between the first tank and the second tank. The direct connection line equalizes gas pressure between the first tank and the second tank, reducing the sealing and mechanical reinforcement required in the battery system.

In another embodiment, the hydrogen reactant is in gas phase and the bromine electrolyte in the second tank is in a liquid phase.

In a further embodiment of the system, the flow battery system further comprises a valve operably positioned between the second tank and the bromine electrode side of the battery cell and a controller configured to operate the valve such that an electrode in the bromine electrolyte side of the battery cell is always immersed in the liquid phase bromine electrolyte. Immersion of the bromine electrode reduces exposure of the electrode to gaseous $H_2$ gas, thereby reducing reactions in the bromine electrode that result in parasitic energy efficiency losses.

In yet another embodiment of the flow battery system, the second tank is configured such that the liquid phase bromine electrolyte fills a first portion of a volume of the second tank, and the first portion is equal to or greater than 90% of the volume of the second tank in a charged state of the battery system and in a discharged state of the battery system. Configuring the second tank such that the bromine electrolyte fills a majority of the tank reduces the quantity of hydrogen reactant in the bromine side of the system that can react with the bromine electrolyte, and reduces the volume available for gaseous bromine to evaporate from the liquid electrolyte.

In another embodiment, the second tank includes a liquid-gas separator configured to float on an upper surface of the bromine electrolyte to separate the first portion from a remaining portion of the tank. The separator reduces mixing of the $H_2$ gas and the liquid bromine electrolyte, and reduces evaporation of bromine into the gas phase, thereby reducing the reactions between the bromine and hydrogen species. In various embodiments, the liquid-gas separator is one of a cover, an oil, a bed of floating objects, a flexible head, a flexible internal enclosure, a piston, and a diaphragm.

In a further embodiment of the flow battery system, the bromine electrolyte side of the at least one cell includes a porous separator membrane and the porous membrane is catalytically inactive with respect to the hydrogen reactant. The porous membrane therefore does not catalyze the kinetically slow $H_2$ reaction, thereby reducing parasitic energy efficiency losses caused by $H_2$ being present at the membrane.

In another embodiment, the bromine electrolyte side of the at least one cell and the second tank are formed of materials that are catalytically inactive with respect to the hydrogen reactant. The bromine electrolyte side of the battery cell and the bromine tank can thereby include $H_2$ gas without catalyzing the $H_2$ reaction and producing energy efficiency losses in the battery system. In one particular embodiment, the bromine electrolyte side of the at least one cell and the second tank are formed of materials having an exchange current density of less than $10^{-9}$ amps per square centimeter with respect to the hydrogen reactant.

In a further embodiment of the system, the direct connection line includes a filter or polymer having an enhanced permeation rate for the hydrogen reactant compared to the bromine electrolyte and the filter or polymer is configured such that gas phase bromine electrolyte entrained in the hydrogen reactant is separated from the hydrogen reactant. The filter or polymer separates bromine electrolyte from the hydrogen reactant to reduce efficiency and capacity losses caused by loss of bromine electrolyte from the bromine side of the system.

In one embodiment according to the disclosure, a flow battery system comprises a first tank including a hydrogen reactant, a second tank including a bromine electrolyte, and at least one cell. The at least one cell includes an hydrogen reactant side operably connected to the first tank, a bromine electrolyte side operably connected to the second tank, and a separator between the first and second electrolyte sides configured to enable passage of the hydrogen reactant from the hydrogen reactant side to the bromine electrolyte side. The separator enables the gas pressure between the first tank and the second tank to equalize through the battery cell, thereby reducing the sealing and mechanical reinforcement required in the battery system.

In another embodiment of the flow battery system, the bromine electrolyte side of the at least one cell includes a porous separator membrane and the porous separator membrane is catalytically inactive with respect to the first electrolyte. The porous separator membrane therefore does not catalyze the kinetically slow $H_2$ reaction, thereby reducing parasitic energy efficiency losses caused by $H_2$ being present at the membrane.

In yet another embodiment, the flow battery system further comprises a valve operably positioned between the second tank and the bromine electrode side of the battery cell and a controller configured to operate the valve such that an electrode in the bromine electrolyte side of the battery cell is always immersed in liquid phase bromine electrolyte. Immersion of the bromine electrode reduces exposure of the electrode to gaseous $H_2$ gas, thereby reducing reactions in the bromine electrode that result in parasitic energy efficiency losses.

In a further embodiment according to the disclosure, the second tank is configured such that the liquid phase bromine electrolyte fills a first portion of a volume of the second tank, and the first portion is equal to or greater than 90% of the volume of the second tank in a charged state of the battery system and in a discharged state of the battery system. Configuring the second tank such that the bromine electrolyte fills a majority of the tank reduces the quantity of hydrogen reactant in the bromine side of the system that can react with the bromine electrolyte, and reduces the volume available for gaseous bromine to evaporate from the liquid electrolyte.

In another embodiment, the second tank includes a liquid-gas separator configured to float on an upper surface of the bromine electrolyte to separate the first portion from a remaining portion of the tank. The separator reduces mixing of the $H_2$ gas and the liquid phase bromine electrolyte, thereby reducing the reactions between the electrolytes. In various embodiments, the liquid-gas separator is one of a cover, an oil, a bed of floating objects, a flexible head, a flexible internal enclosure, and a piston.

In one embodiment of the flow battery system, the bromine electrolyte side of the at least one cell and the second tank are formed of materials that are catalytically inactive with respect to the hydrogen reactant. The bromine electrolyte side of the battery cell and the bromine tank can thereby include $H_2$ gas without catalyzing the $H_2$ reaction and producing energy efficiency losses in the battery system. In one particular embodiment, the bromine electrolyte side of the at least one cell and the second tank are formed of materials having an exchange current density of less than $10^{-9}$ amps per square centimeter with respect to the hydrogen reactant.

In another embodiment, the flow battery system further comprises a connecting line operably connecting the first tank and the second tank such that a first pressure of $H_2$ in the first tank is substantially equal to a second pressure of $H_2$ gas in the second tank. The connecting line supplements the passage of hydrogen reactant between the two tanks to improve pressure equalization between the tanks.

In some embodiments, the connecting line includes a filter or polymer having an enhanced permeation rate for the hydrogen reactant compared to gas phase bromine, and the filter or polymer is configured such that gas phase bromine entrained in the hydrogen reactant is separated from the hydrogen reactant. The filter or polymer separates gas phase bromine from the hydrogen reactant to reduce efficiency and capacity losses caused by loss of bromine from the bromine side of the system.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

Figure 2:
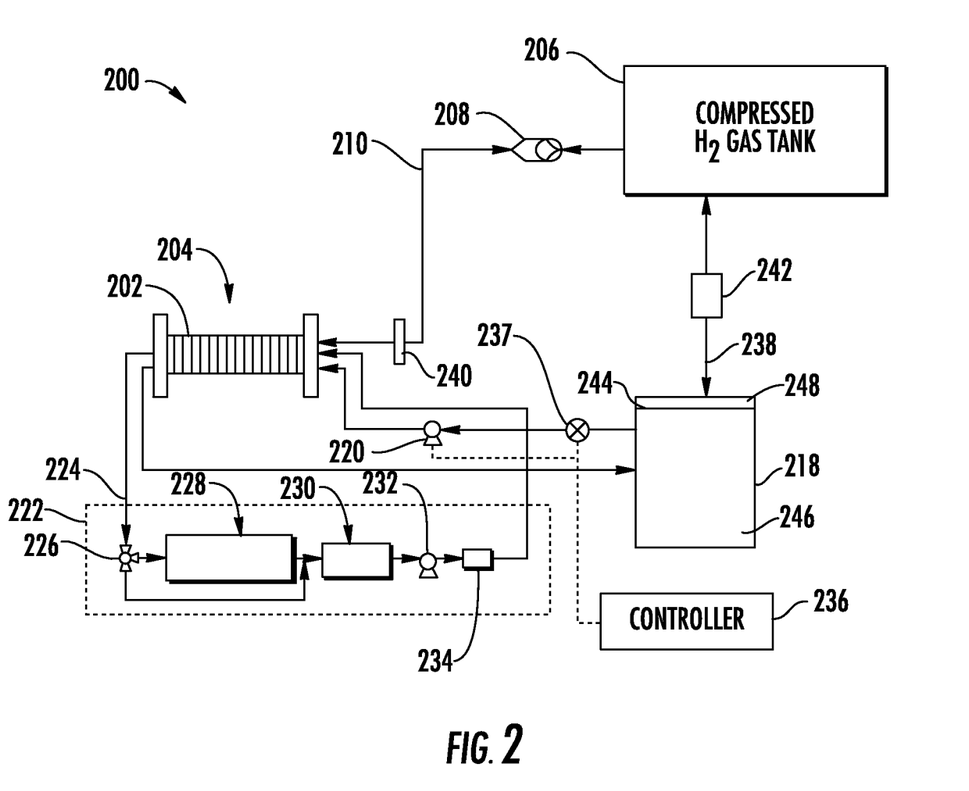
FIG. 2 is a schematic diagram of an $H_2/Br_2$ flow battery system according to the disclosure in which the $H_2$ and $Br_2/HBr$ tanks are directly connected to one another to allow the equilibration of the pressure of $H_2$.

FIG. 2 schematically illustrates an embodiment of an $H_2/Br_2$ flow battery system 200 according to the present disclosure. The flow battery system 200 includes a plurality of battery cells 202 stacked together to form a battery stack 204. A first supply tank 206 for storing a reactant, which, in the illustrated embodiment, is compressed hydrogen gas ($H_2$), is coupled to a pressure regulator or pressure switch 208, which is in turn coupled to a compression line 210. In one embodiment, the compression line 210 is a mechanical compression line having a compressor (not shown) to compress the hydrogen gas to a predetermined pressure before the gas enters the battery stack 204. In another embodiment, the compression line 210 is an electrochemical $H_2$ compression line that increases the energy density of the system. The compression line 210 is connected to the hydrogen gas side of the battery stack 204 to deliver compressed hydrogen gas to the battery stack 204.

A supply tank 218 stores an electrolyte solution, which, in the illustrated embodiment, is a liquid hydrogen bromide ($Br_2/HBr$) solution. The $Br_2/HBr$ solution is delivered through a pump 220 to a $Br_2/HBr$ side of the battery stack 204. In some embodiments, the flow battery system 200 includes a separate coolant loop 222 to cool the $Br_2/HBr$ solution flowing through the battery stack 204. The coolant loop 222 receives solution at an input 224 coupled to a thermostat/valve 226, which either directs the solution through a high temperature radiator 228 or bypasses the radiator 228 to a coolant reservoir 230. Cooled solution is stored in the reservoir 230 for delivery to the battery stack 204 by coolant pump 232 through a coolant DI filter 234. In other embodiments, the $Br_2/HBr$ solution is passed through a radiator for cooling instead of the system including a separate coolant loop 222 to cool the battery stack 204.

As described above, compression of the $H_2$ gas, in different embodiments, is accomplished in a number of ways, including electrochemical compression or mechanical compression. Electrochemical compression has higher energy efficiency than mechanical compression, but results in the battery stack 204 operating at an elevated pressure.

In some embodiments, a battery management system, for example a controller 236, is used to ensure the efficient operation of the $H_2/Br_2$ battery system. In particular, the controller 236 is operably connected to the pump 220 and is configured to operate the pump 220 to pump a predetermined flow of $H_2$ and $Br_2$/HBr through the battery stack 204 during discharge of the battery stack 204. The predetermined flow is related to the current demanded from the device being supplied with power delivered by the battery stack 204. In some embodiments, the controller 236 is operably connected to a valve 237 and configured to operate the valve 237 to open or close to allow a predetermined quantity of liquid $Br_2$/HBr into the battery stack 204 to retain a predetermined amount of the liquid $Br_2$/HBr in the battery cells 202. The controller 236 is implemented with general or specialized programmable processors that execute programmed instructions. The instructions and data required to perform the programmed functions are stored in a memory associated with the controller 236. The processors, memory, and interface circuitry configure the controller 236 to perform the functions and processes described herein. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in VLSI circuits. Also, the circuits described herein can be implemented with a combination of processors, ASICs, discrete components, or VLSI circuits.

The pressure of the hydrogen in the tank 206, in different embodiments, ranges from several bar to several hundred bar, depending on the desired energy density of the system and the permissible energy for $H_2$ compression. The composition of the $Br_2$/HBr electrolyte is chosen based on several factors, including determining the amount of HBr that needs to be present to allow rapid ionic transport within the solution, determining a sufficient amount of $Br_2$ such that the size of the $Br_2$/HBr tank is within design limits for the system, and determining the point at which, as the HBr concentration is increased, the conductivity of membranes (typically Nafion) of the flow battery stack 204 falls due to the membrane drying out. In one embodiment, the concentration in the fully charged state is 1M $Br_2$ in 1M HBr, though higher or lower concentrations are used in other embodiments.

In conventional $H_2/Br_2$ flow battery systems, the pressure of the $H_2$ exposed to the $H_2$ side of the battery cell 202 is reduced through the use of a pressure regulator, such as pressure switch 208, located between the pressurized $H_2$ tanks and the stack. Reducing the pressure, however, results in loss of the energy of compression. In some embodiments, the pressure is not reduced and the battery cell is operated with a significant pressure differential between the $H_2$ side and the $Br_2$ side of the battery cell 202, thereby introducing mechanical stresses to the membrane and other stack components, such as seals.

In some flow battery systems, the bromine species cross over the porous membrane into the hydrogen side of the battery. Crossover of active material can result in decreased charge capacity of the battery since the battery has less active bromine material on the bromine side of the battery cells. One challenge for this implementation of hydrogen balancing is the need to prevent significant quantities of gaseous $H_2O$, HBr, and $Br_2$ (or polybromides) from being passed with the $H_2$ to the $H_2$ side of the cell during the discharge process, when $H_2$ is being consumed on the $H_2$ side of the system. In some embodiments, the system 200 includes a filter or a polymer 240 in the compression line 210. The filters or polymers 240 has an enhanced permeation rate for $H_2$ compared to water and bromine species, and thereby limiting crossover of species other than $H_2$.

In the embodiment of FIG. 2, the system 200 is configured for the passage of $H_2$ between the two sides of the battery cell to provide for pressure balancing between the $H_2$ and $Br_2$ sides of the battery cells 202, thereby reducing the sealing requirements, mechanical reinforcement within the battery stack 204, and reducing overall cost of the battery system 200. In one embodiment, the hydrogen gas tank 206 is connected to the liquid $Br_2$/HBr tank 218 through a direct connection 238. As a result of the direct connection between the tanks 206, 218, the $H_2$ pressure is equal or nearly equal on both the $H_2$ side and the $Br_2$/HBr sides of the battery cells 202. The embodiment of FIG. 2 therefore enables use of the mechanical or electrochemical compression energy, which is recovered electrochemically upon discharge. Additional mechanical stresses across the membrane are avoided because each side operates at the same pressure, improving the longevity and durability of the battery system 200.

As used herein, the term "direct connection" referring to the connection between the $H_2$ and $Br_2$/HBr tanks 206, 218 refers to a pipe or tube connecting the tanks 206, 218 to one another. As discussed in detail below, the direct connection 238 may include components to separate the hydrogen gas from bromine compounds entrained in the gas, for example membranes, filters, polymers, or riser pipes. However, the direct connection 238 does not travel through the battery stack 204 or coolant loop 222.

In some embodiments, the system 200 includes a filter or a polymer 242 in the connection line 238. The filter or polymer 242 may, in some embodiments, be similar to the filter or polymer 240 discussed above. The filter or polymer 242 separates the bromine species from the hydrogen travelling between the liquid tank 218 and the gas tank 206 to reduce losses of bromine material in the liquid tank 218.

In some embodiments, in addition to or as an alternative to the filter or polymer 242, the $Br_2$/HBr liquid storage tank 218 includes a cover 244 configured to separate the liquid 246 in the $Br_2$/HBr tank from the gas 248 present in the tank. In particular embodiments, the cover 244 is configured as a continuous form, similar to a pool cover, and is made of a compatible sheet, floating oil, paraffin, or other suitable material. In other embodiments, the cover 244 is composed of a bed of floating objects, for example hollow polytetrafluoroethylene (also referred to as PTFE or Teflon®) spheres. In further embodiments, in addition to or as an alternative to the filter or polymers or the cover, the $Br_2$/HBr tank 218 includes a skinny riser pipe that goes up to a "T" connection for the $H_2$ flow. The skinny riser pipe produces a diffusion barrier to the transport of $H_2O$, HBr, and $Br_2$, while allowing the flow of $H_2$ gas from the $Br_2$/HBr tank 218 to the $H_2$ tank 206.

Figure 3:
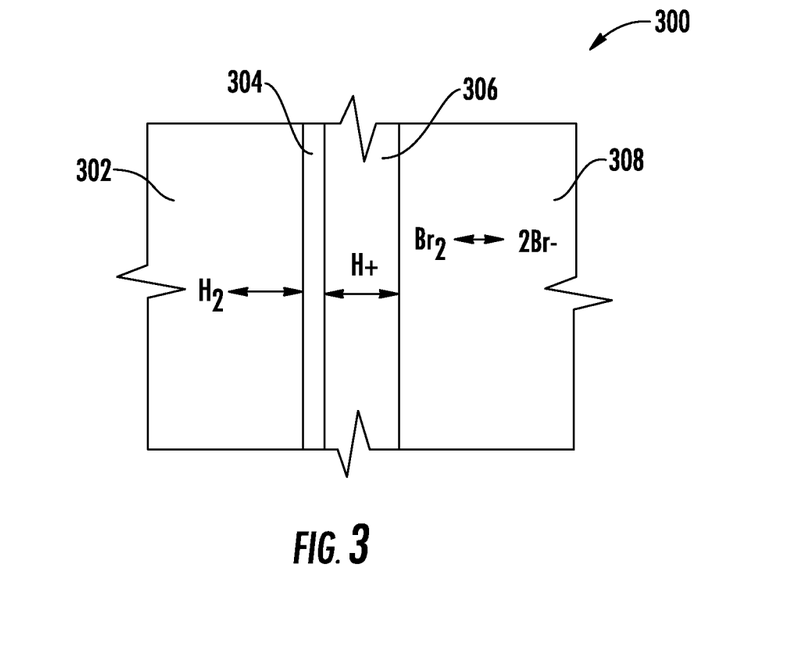
FIG. 3 is a schematic diagram of layers of an $H_2/Br_2$ flow battery cell having a separator that allows the passage of protons from the $H_2$ side to the $Br_2$ side of the battery cell.

In one embodiment, in place of or in addition to the direct connection 238, the compressed $H_2$ gas tank 206 is connected to the liquid $Br_2$/HBr tank 218 through the battery stack 204. FIG. 3 depicts a schematic view of the layers of an $H_2/Br_2$ battery cell 300 through which hydrogen and bromine tanks are connected. A hydrogen electrode is composed of an electronically conductive porous medium 302, which, in some embodiments, is formed of a porous carbon material, such as a porous carbon paper. Hydrogen gas is transported through the porous medium 302 via diffusion and convection to a catalyst layer 304 of the hydrogen electrode. The catalyst layer 304 includes a catalyst material, for example platinum, as well as an ionically conductive material such as Nafion®. The electrochemical oxidation and reduction of $H_2$ occurs in the catalyst layer 304, where electrons are generated or consumed to charge or discharge the battery. The electrons are transported through another porous medium 308 on the bromine side of the cell, and eventually to an external circuit (not shown). The battery cell 300 further includes a separator layer 306, through which $H^+$ passes from the hydrogen side of the battery cell 300 to the bromine side of the cell. In the embodiment of FIG. 3, the porous medium 308 only contain materials that are either catalytically inactive or have a very limited catalytic activity to $H_2$ gas to avoid reaction of $Br_2$ and $H_2$ in the porous medium 308 of the $Br_2$ side of the battery.

The embodiment of FIG. 3 includes a separator layer 306 instead of the non-porous ion exchange membrane, for example membrane 124 in FIG. 1. The separator layer 306 is configured such that it is not impervious to hydrogen gas and, as a result, $H_2$ crossover occurs directly through the separator layer 306. The rate of hydrogen gas passage through the separator layer 306 depends on the composition and thickness of the separator layer 306. In one embodiment, the separator layer 306 includes a microporous separator to provide greater hydrogen balancing flux.

$H_2$ gas on the $Br_2$ side of the cell is thermodynamically favored to react with the $Br_2$, either in a surface-catalyzed reaction or in a homogeneous reaction. However, as described in detail below, the slow kinetics of the $H_2$ reaction generally prevent the reaction from taking place except at elevated temperatures or in the presence of a catalyst such as platinum.

Figure 4:
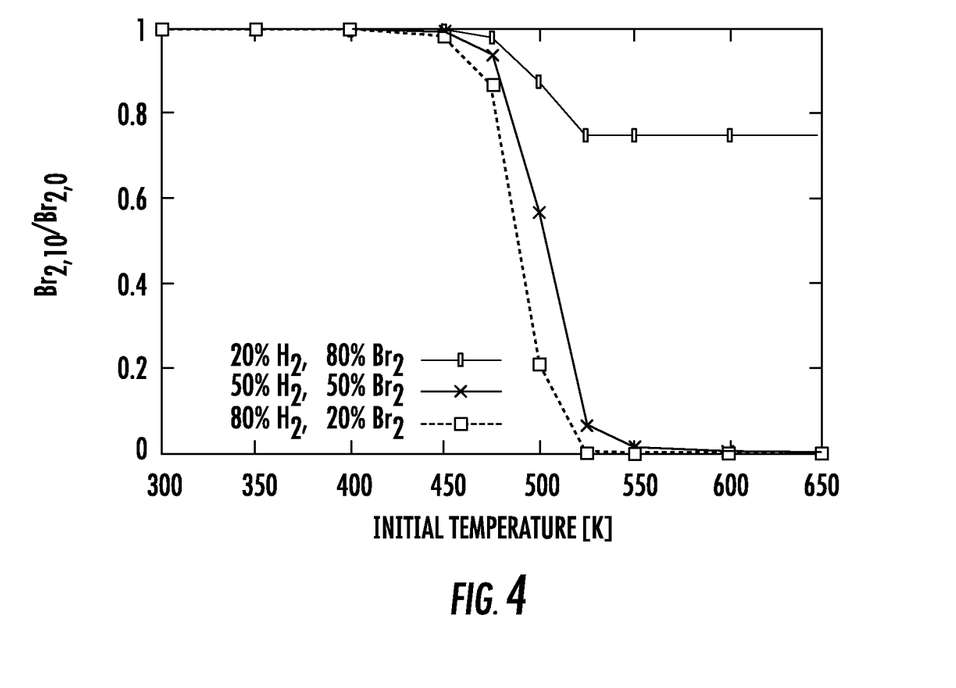
FIG. 4 is a graph of a spontaneous reaction of various mixtures of $H_2$ and $Br_2$ after 10 hours as a function of temperature, showing the fraction of $Br_2$ remaining.
Figure 5:
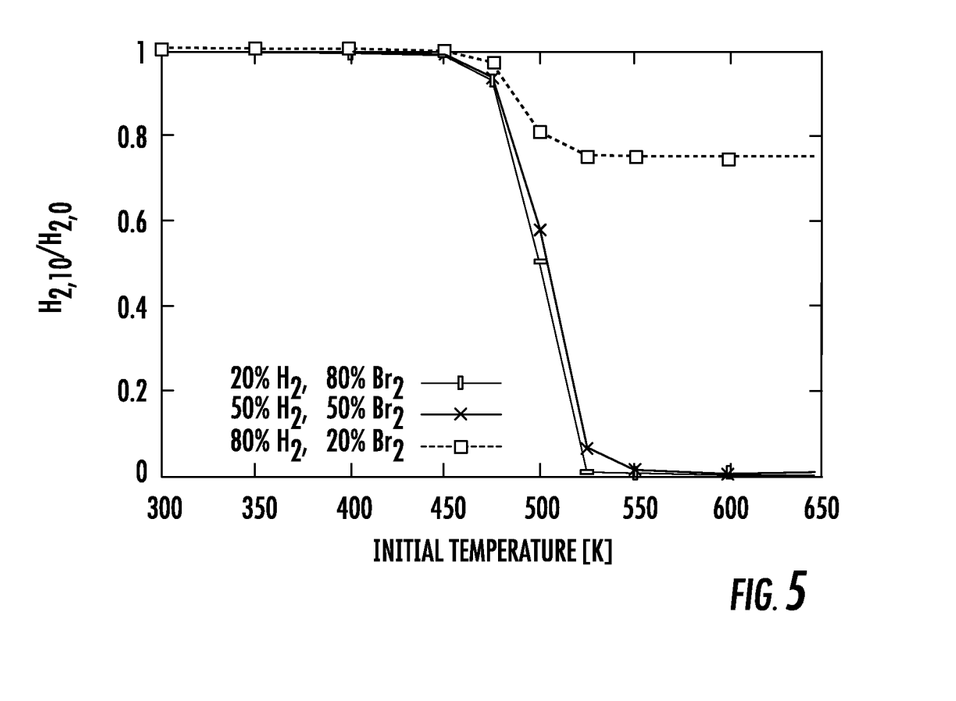
FIG. 5 is a graph of a spontaneous reaction of various mixtures of $H_2$ and $Br_2$ after 10 hours as a function of temperature, showing the fraction of $H_2$ remaining.

FIG. 4 illustrates experimental results of the fraction of bromine material that has spontaneously reacted after 10 hours for of mixtures of several compositions of $H_2$ and $Br_2$ as a function of temperature in Kelvin (K), while FIG. 5 illustrates the corresponding fraction of $H_2$ that has spontaneously reacted for the same compositions. As the figures show, at temperatures below 400 degrees K there is no significant reaction after 10 hours, while at temperatures above 500 degrees K the reaction rate becomes significant. The flow battery systems are typically designed to operate at temperatures less than 373 degrees K and, as a result, FIGS. 4 and 5 demonstrate that, in the absence of a catalyst, the spontaneous reaction between $H_2$ and $Br_2$ gases is insignificant. Consequently, while such mixtures are thermodynamically favored to react, the kinetics are too slow for any appreciable amount of reaction to take place.

Figure 6:
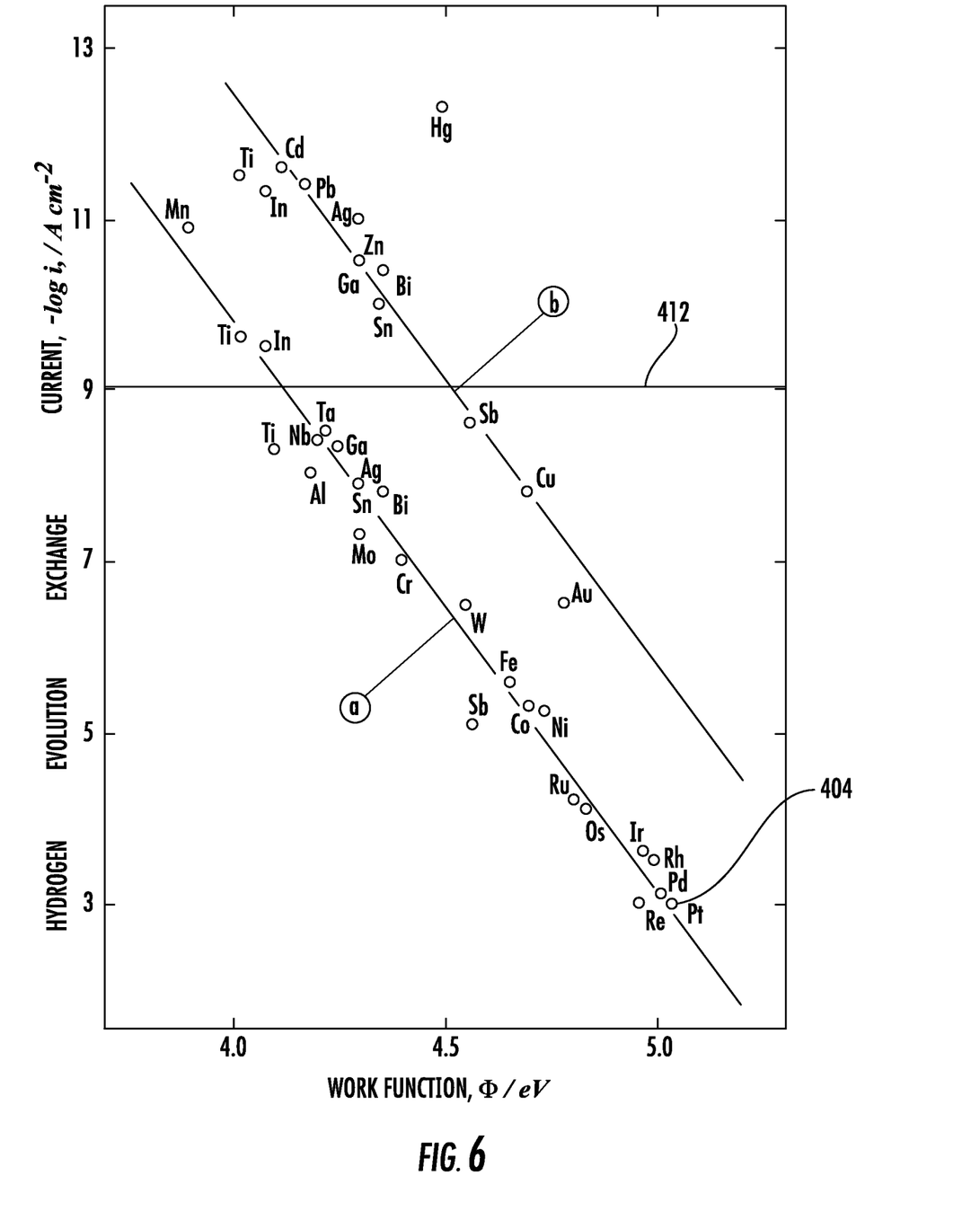
FIG. 6 a graph of a hydrogen evolution reaction exchange current for a variety of metals plotted against the work function of the metals.
Figure 7:
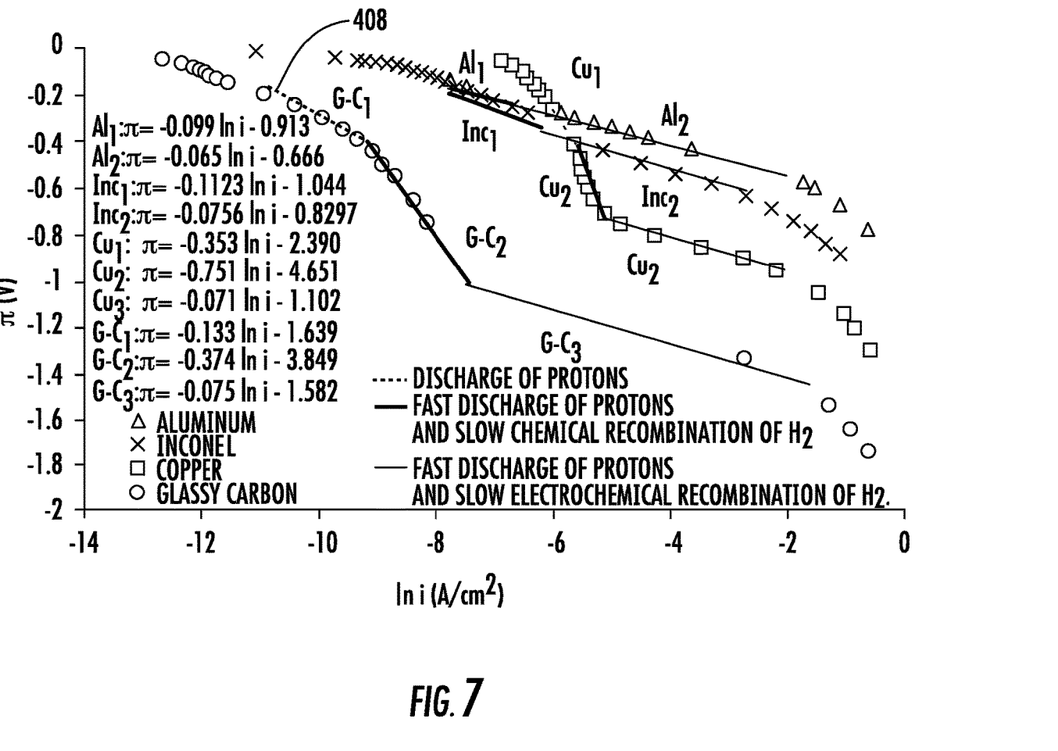
FIG. 7 is a graph of current density measured with a rotating disc electrode setup for hydrogen evolution as a function of the applied potential in a 1M $H_2SO_4$ solution.

FIG. 6 illustrates an inverse log plot of the reaction exchange current for a variety of metals, including platinum (shown at point 404), which is typically used as the catalyst layer 116, 304 for the $H_2$ reaction in the battery cell. FIG. 7 illustrates the current density of a rotating disc electrode setup for hydrogen evolution as a function of the applied potential in a 1M $H_2SO_4$ solution, showing, in particular, the reaction rates for glassy carbon (G-C, shown at line 408). FIGS. 6 and 7 illustrate that the exchange current density of the reaction on glassy carbon (approximately $10^{-9}$ A/cm$^2$) is about a factor of $10^6$ slower than the reaction rate on a platinum catalyst (approximately $10^{-3}$ A/cm$^2$).

Reacting $H_2$ is the kinetically limiting step in the reaction of $H_2$ and $Br_2$, and the kinetics of $H_2$ evolution are similar to those for $H_2$ oxidation. Since the hydrogen and bromine components are mixed together in the bromine side of the battery system, in some embodiments, the bromine side of the cell, including the electrodes, porous medium, tanks, pipes, and other components, is designed to avoid materials that catalyze the reaction of $H_2$ and $Br_2$. In particular, platinum and platinum-based alloys, as well as any of the elements or alloys of the elements with an exchange current greater than approximately $10^{-9}$ A/cm$^2$ (shown, for example, by line 412 in FIG. 6) are avoided to minimize reaction of the $H_2$, even when the $H_2$ on the bromine side of the system is exposed directly to $Br_2$ or polybromides in an electrochemical environment. As a result, the $H_2$—$Br_2$ reactions are confined to the electrode on the hydrogen side of the battery cells, thereby enabling useful work from the reaction and reducing parasitic energy losses from reactions occurring in areas of the battery where useful work cannot be captured.

While carbon is generally catalytically inactive towards hydrogen evolution and proton reduction reactions, the high surface area of carbon electrode surfaces can, in some instances, enhance the reaction of the hydrogen reaction simply through the larger surface area of the carbon. Therefore, in some embodiments, the battery cell is configured such that exposure of the carbon electrode on the $Br_2$ side of the battery cell to the hydrogen gas is reduced or eliminated. In one embodiment, illustrated in FIG. 8a, the system is configured such that the entire $Br_2$ electrode 504 is fully immersed in a liquid $Br_2$/HBr solution 508 at all times, avoiding exposure of any portions 512 (FIG. 8b) of the $Br_2$ electrode 504 to the hydrogen gas. Full immersion of the $Br_2$ electrode 504 during charging is particularly advantageous because, during charging, the potential of the $Br_2$ electrode 504 is elevated, providing a higher driving force for the reaction of $H_2$.

Figure 8A:
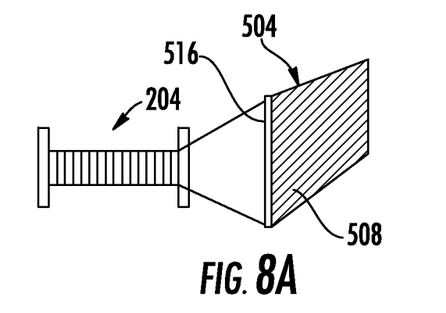
FIG. 8a is a schematic diagram of an electrode on a flow plate fully immersed in a liquid $Br_2/HBr$ solution.
Figure 8B:
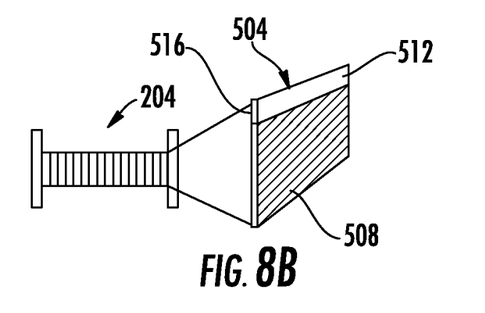
FIG. 8b is a schematic diagram of an electrode on a flow plate only partially immersed in a liquid $Br_2/HBr$ solution where exposure to gaseous $H_2$ may occur.

In some instances, $Br_2$ electrodes 504 may be exposed to $H_2$ gas directly if liquids are allowed to drain out of the stack when the system is not in use. In one embodiment according to the disclosure, liquids are maintained in the stack through the use of a valve, for example valve 237, that prevents draining of the stack, even when the battery is not in use. In another embodiment, a sensor 516 is connected to the battery system controller, for example controller 236, to monitor the liquid level in the stack and the valve 237 is operated by the controller 236 to prevent the liquid level from falling to a point at which the $Br_2$ electrode 504 is exposed to gaseous $H_2$. Avoiding exposure of the electrode on the bromine side of the battery cell reduces reaction of the hydrogen and bromine, thereby reducing parasitic energy losses in a similar manner as described above.

Figure 9:
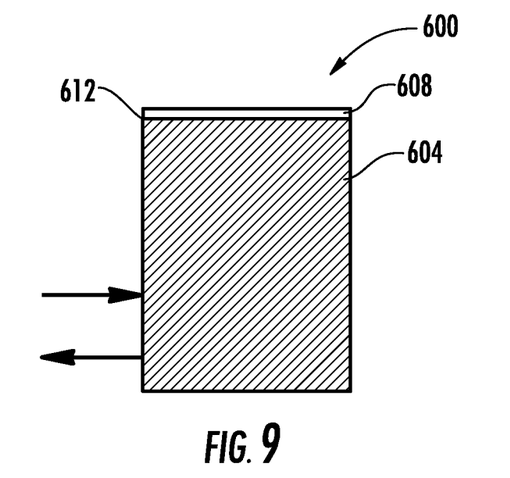
FIG. 9 is a schematic diagram of a combined $Br_2/HBr$ tank having a liquid level chosen to limit the gaseous headspace and thereby the quantity of $H_2$ present.

FIG. 9 illustrates a $Br_2$/HBr tank 600, which, in some embodiments, is used in place of the tank 218 described above. The $Br_2$/HBr tank 600 is sized such that the quantity of liquid $Br_2$/HBr 604 in the tank 600 almost completely fills the tank 600. In one embodiment, the volume of the tank is at least 90% filled with liquid $Br_2$/HBr during a charge state, a discharge state, and at all other times. In another embodiment, the volume of the tank is at least 95% filled with the liquid $Br_2$/HBr solution during the charge state, the discharge state, and all other times. As a result, the gaseous headspace 608 in the tank is minimized, leaving less space for hydrogen gas in the bromine side of the system. Because the solubility of $H_2$ in aqueous solutions is very small, using a small headspace on the $Br_2$ side of the system limits the total amount of $H_2$ that is available to react. Furthermore, the volume available for gaseous bromine to evaporate from the liquid electrolyte is reduced. In addition or as an alternative to sizing the tank 600 and the volume of the $Br_2$/HBr liquid 604 to be nearly the same, in some embodiments, the tank 600 has a flexible liquid volume, which is delineated by a movable liquid-gas separator 612. In some embodiments, the liquid-gas separator 612 is a flexible head, a flexible internal enclosure, a piston, or a diaphragm that provides for a variable internal liquid volume in the tank 600. The flexible portion limits the gas volume in the headspace and is particularly advantageous since the volume of the $Br_2$/HBr solution may change with the state of charge of the system (i.e., the relative amounts of $Br_2$ and HBr in the solution). In other embodiments, the tank 600 includes a skinny riser pipe or other methods and apparatus to limit the volume of the headspace or separate the gas from the liquid in the tank 600. Reducing the amount of hydrogen available to react with the bromine species in the bromine side of the battery system further limits the reaction of hydrogen and bromine outside of the useful reaction areas in the battery, improving the overall energy efficiency of the flow battery system.

Figure 10:
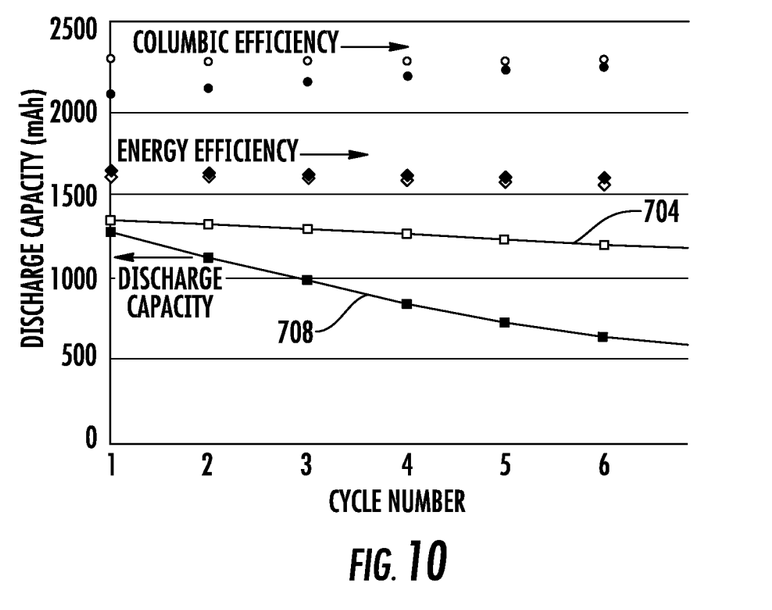
FIG. 10 is a graph of experimental results from the operation of flow battery cells to compare a first setup in which an anode exhaust gas (composed primarily of $H_2$) is vented from the system and not passed through the $Br_2/HBr$ side of the cell of a flow battery with a second setup in which an $H_2$ gas passed through the $Br_2/HBr$ side of a flow cell battery prior to being exhausted.

FIG. 10 illustrates a plot of discharge capacity versus a number of cycles for two different experimental setups. In the first experiment, the anode exhaust gas (composed of $H_2$ and Br species that have crossed over to the $H_2$ side of the system) is vented from the system and not passed through the $Br_2$/HBr side of the cell, shown by the open data points and line 704 in FIG. 10. In the second experiment, the anode exhaust gas is passed through the $Br_2$/HBr side of the cell before being vented, shown by the filled data points and line 708 in FIG. 10.

The $H_2$/$Br_2$ cell was cycled at 300 mA/cm², and all other aspects of the two cell setups were the same. In the experiment in which the exhaust gas is vented, a small amount of bromine species (including bromide ion, polybromides, and possibly molecular bromine) crosses through the cell membrane from the cathode and is released to the atmosphere. This loss of bromine from the system appears as a slow decay of capacity in line 704 of FIG. 10. It also contributes to the Coulombic inefficiency, as the bromine lost during charge is not available to contribute to discharge capacity during the following half-cycle. With a Coulombic efficiency of approximately 90%, the rate of capacity fade is significant (i.e., less than 100 cycles can be achieved).

In the second case, the anode exhaust is passed through the $Br_2$/HBr tank before being vented. This transfer allows re-capture of the liquid water and some crossed-over bromine that is dissolved in the liquid phase of the anode exhaust. The vapor pressure of bromine in the gas headspace of the tank can be significant, especially at high states-of-charge, when the bromine concentration in the liquid is high and dark bromine gas is visible in the headspace. The bromine vapor is entrained in the anode exhaust gas flow, and vented to the atmosphere. This significant loss of bromine from the system results in rapid degradation of the capacity, as shown by line 708 of FIG. 10. It should be noted that replacing the catholyte with fresh material recovers the initial capacity and, as a result, it can be inferred that the mere presence of hydrogen in the headspace, and therefore dissolved in the liquid, does not permanently degrade cell components.

Furthermore, the energy efficiency of the two scenarios is very similar. If hydrogen caused a mixed potential on the cathode side (indicating the $H_2$ was reacting), it would appear in FIG. 10 as reduced energy efficiency. Additionally, if the presence of hydrogen caused a large self-discharge current, it would appear as a Coulombic inefficiency. Coulombic efficiency greater than 90% is achieved, suggesting that, indeed, hydrogen gas in the bromine side of the battery cell does not reduce energy efficiency, storage capacity, or Coulombic efficiency of the battery system. During the initial cycles, the Coulombic efficiency is lower due to the rapid loss of bromine from the system. As bromine is removed from the system, the vapor pressure is reduced and the rate of bromine loss is reduced. This accounts for the increase of Coulombic efficiency over the first few cycles.

Figure 11:
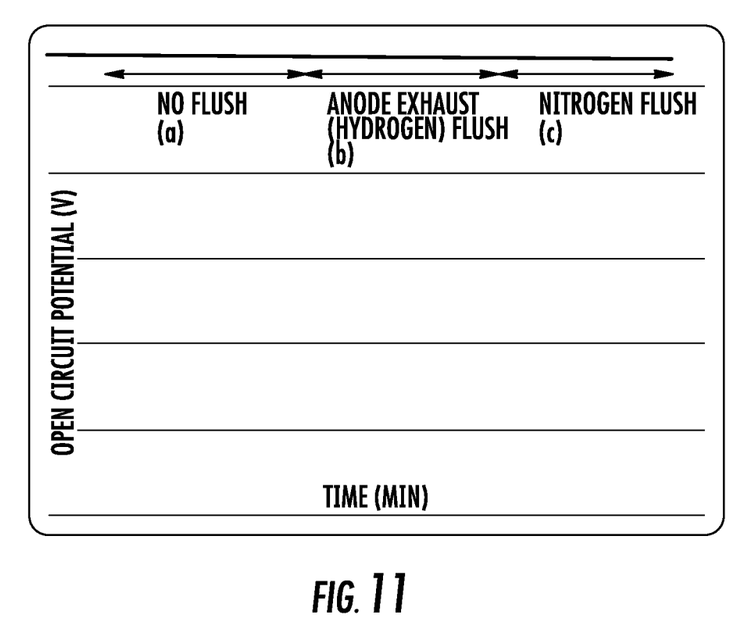
FIG. 11 is a graph illustrating that an open-circuit potential of a flow battery cell does not change compared to a base case of no gas flushing (a) even as hydrogen (b) and nitrogen (c) are flushed past the electrode of the flow battery cell.

FIG. 11 illustrates the open-circuit voltage (OCV) of a cell (a) without and (b) with flushing of the anode exhaust gas, which is primarily hydrogen, through the cathode electrolyte ($Br_2$/HBr) tank head space. For comparison, a cell (c) is flushed with nitrogen, which does not react with bromine species. The introduction of anode exhaust to the cathode tank does not introduce a discontinuous change in the open-circuit voltage, suggesting that presence of hydrogen in the cathode tank headspace does not establish a mixed potential at the cathode. There is a slow decay of OCV due to loss of bromine from the system or self-discharge, but the rate of decay is not influenced by the presence of hydrogen in the catholyte tank. As such, FIG. 11 illustrates that there is no loss of voltage from the battery merely due to the existence of hydrogen gas in the $Br_2$ side of the system.

As can be determined from FIGS. 10 and 11, the behavior of the flow battery system with or without hydrogen in the cathode tank headspace is similar. The differences that do exist can be attributed to loss of bromine, and not cell component degradation or $H_2$ reaction on the $Br_2$ side of the cell. Consequently, mixing hydrogen gas into the bromine side of the battery cell does not degrade the energy efficiency or storage capacity of the flow battery system.

While the disclosure describes an $H_2$/$Br_2$ flow battery, the disclosure is applicable to the wide class of flow battery systems that depend on active materials being transported into electrodes at sufficiently high rates.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the foregoing disclosure.

What is claimed is:

1. A flow battery system, comprising:
    a hydrogen reactant;
    a first tank including a first portion of the hydrogen reactant;
    a second tank including a bromine electrolyte;
    at least one cell including a hydrogen reactant side operably connected to the first tank and a bromine electrolyte side operably connected to the second tank; and
    a direct connection line directly connecting the first tank and the second tank and configured such that the first portion of the hydrogen reactant moves from the first tank into the direct connection line and a second portion of the hydrogen reactant passes from the direct connection line into the second tank when the first tank has a pressure higher than the second tank.

2. The flow battery system of claim 1, wherein the hydrogen reactant is in gas phase and the bromine electrolyte in the second tank is in a liquid phase.

3. The flow battery system of claim 2, further comprising:
a valve operably positioned between the second tank and the bromine electrode side of the at least one cell; and
a controller configured to operate the valve such that an electrode in the bromine electrolyte side of the at least one cell is always immersed in the liquid phase bromine electrolyte.

4. The flow battery system of claim 2, wherein the second tank is configured such that the liquid phase bromine electrolyte fills a first portion of a volume of the second tank, and the first portion is equal to or greater than 90% of the volume of the second tank in a charged state of the battery system and in a discharged state of the battery system.

5. The flow battery system of claim 4, wherein the second tank includes a liquid-gas separator configured to float on an upper surface of the bromine electrolyte to separate the first portion from a remaining portion of the tank, the remaining portion of the tank including a third portion of the hydrogen reactant.

6. The flow battery system of claim 5, wherein the liquid-gas separator is selected from the group consisting of a cover, an oil, a bed of floating objects, a flexible head, a flexible internal enclosure, a piston, and a diaphragm.

7. The flow battery system of claim 1, wherein:
the bromine electrolyte side of the at least one cell includes a porous separator membrane; and
the porous separator membrane is catalytically inactive with respect to the hydrogen reactant.

8. The flow battery system of claim 1, wherein the bromine electrolyte side of the at least one cell and the second tank are formed of materials that are catalytically inactive with respect to the hydrogen reactant.

9. The flow battery system of claim 8, wherein the bromine electrolyte side of the at least one cell and the second tank are formed of materials having an exchange current density of less than $10^{-9}$ amps per square centimeter with respect to the hydrogen reactant.

10. The flow battery system of claim 1, wherein
the direct connection line includes a filter or polymer having an enhanced permeation rate for the hydrogen reactant compared to gas phase bromine entrained in the hydrogen reactant; and
the filter or polymer is configured such that the gas phase bromine entrained in the hydrogen reactant is separated from the hydrogen reactant.

11. A flow battery system, comprising:
a first tank including an hydrogen reactant;
a second tank including a bromine electrolyte;
at least one cell including an hydrogen reactant side operably connected to the first tank, a bromine electrolyte side operably connected to the second tank, and a separator between the hydrogen reactant side and the bromine electrolyte side configured to enable passage of the hydrogen reactant from the hydrogen reactant side to the bromine electrolyte side within the at least one cell;
a valve operably positioned between the second tank and the bromine electrode side of the battery cell; and
a controller configured to operate the valve such that an electrode in the bromine electrolyte side of the battery cell is always immersed in liquid phase bromine electrolyte, wherein:
the bromine electrolyte side of the at least one cell includes a porous separator membrane; and
the porous separator membrane is catalytically inactive with respect to the hydrogen reactant.

12. A flow battery system, comprising:
a first tank including an hydrogen reactant;
a second tank including a bromine electrolyte; and
at least one cell including an hydrogen reactant side operably connected to the first tank, a bromine electrolyte side operably connected to the second tank, and a separator between the hydrogen reactant side and the bromine electrolyte side configured to enable passage of the hydrogen reactant from the hydrogen reactant side to the bromine electrolyte side within the at least one cell, wherein
the bromine electrolyte side of the at least one cell includes a porous separator membrane;
the porous separator membrane is catalytically inactive with respect to the hydrogen reactant;
the second tank is configured such that liquid phase bromine electrolyte fills a first portion of a volume of the second tank; and
the first portion is equal to or greater than 90% of the volume of the second tank in a charged state of the battery system and in a discharged state of the battery system.

13. The flow battery system of claim 12, wherein the second tank includes a liquid-gas separator configured to float on an upper surface of the bromine electrolyte to separate the first portion from a remaining portion of the tank, the remaining portion including hydrogen reactant.

14. The flow battery system of claim 13, wherein the liquid-gas separator is selected from the group consisting of a cover, an oil, a bed of floating objects, a flexible head, a flexible internal enclosure, a piston, and a diaphragm.

15. A flow battery system, comprising:
a first tank including an hydrogen reactant;
a second tank including a bromine electrolyte;
at least one cell including an hydrogen reactant side operably connected to the first tank, a bromine electrolyte side operably connected to the second tank, and a separator between the hydrogen reactant side and the bromine electrolyte side configured to enable passage of the hydrogen reactant from the hydrogen reactant side to the bromine electrolyte side within the at least one cell; and
a connecting line operably connecting the first tank and the second tank such that a first pressure of $H_2$ in the first tank is substantially equal to a second pressure of $H_2$ gas in the second tank, wherein:
the bromine electrolyte side of the at least one cell includes a porous separator membrane;
the porous separator membrane is catalytically inactive with respect to the hydrogen reactant;
the connecting line includes a filter or polymer having an enhanced permeation rate for the hydrogen reactant compared to gas phase bromine entrained in the hydrogen reactant; and
the filter or polymer is configured such that the gas phase bromine entrained in the hydrogen reactant is separated from the hydrogen reactant.

* * * * *